United States Patent
Liu

(10) Patent No.: US 8,856,685 B2
(45) Date of Patent: Oct. 7, 2014

(54) METHOD AND SYSTEM FOR PROVIDING WEB CONTENT ON A MOBILE DEVICE

(75) Inventor: Eric Liu, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 103 days.

(21) Appl. No.: 13/192,888

(22) Filed: Jul. 28, 2011

(65) Prior Publication Data

US 2013/0031512 A1   Jan. 31, 2013

(51) Int. Cl.
*G06F 3/048* (2013.01)
*G06F 17/30* (2006.01)
*G06F 9/445* (2006.01)

(52) U.S. Cl.
CPC ............ *G06F 8/61* (2013.01); *G06F 17/30887* (2013.01)
USPC ............................................ 715/835; 715/764

(58) Field of Classification Search
None
See application file for complete search history.

(56) References Cited

U.S. PATENT DOCUMENTS

| | | | | |
|---|---|---|---|---|
| 5,963,964 A | * | 10/1999 | Nielsen | 715/255 |
| 6,456,307 B1 | * | 9/2002 | Bates et al. | 715/838 |
| 6,819,340 B2 | * | 11/2004 | Burke | 715/738 |
| 2005/0154759 A1 | * | 7/2005 | Hofmeister et al. | 707/104.1 |
| 2007/0101291 A1 | * | 5/2007 | Forstall et al. | 715/805 |
| 2008/0055273 A1 | * | 3/2008 | Forstall | 345/173 |
| 2008/0282196 A1 | * | 11/2008 | Park | 715/838 |
| 2009/0178006 A1 | * | 7/2009 | Lemay et al. | 715/835 |
| 2009/0288004 A1 | * | 11/2009 | Strandell et al. | 715/710 |
| 2010/0069056 A1 | * | 3/2010 | Pope et al. | 455/419 |
| 2010/0107150 A1 | | 4/2010 | Kamada et al. | |
| 2010/0251230 A1 | * | 9/2010 | O'Farrell et al. | 717/173 |

FOREIGN PATENT DOCUMENTS

WO    WO-2008082360 A1    7/2008

OTHER PUBLICATIONS

"Mobile Travel AideTM Ver. 1.0"; Creative Algorithms; Apr. 17, 2006; 2 pages.
Readon, M.; "GetJar: the Unknown App Store Leader"; Nov. 6, 2009; 6 pages.

* cited by examiner

*Primary Examiner* — Matt Kim
*Assistant Examiner* — Mahelet Shiberou
(74) *Attorney, Agent, or Firm* — Fulbright & Jaworski LLP

(57) ABSTRACT

Embodiments of the present invention disclose a method and system for providing web content on a mobile device. According to one embodiment, a webpage shortcut associated with a webpage is provided on an application catalog. The webpage shortcut is provided on the mobile device based on a selection from an operating user browsing the application catalog. Lastly, the webpage shortcut is updated into a mobile application.

20 Claims, 7 Drawing Sheets

METHOD AND SYSTEM FOR PROVIDING WEB CONTENT ON A MOBILE DEVICE

BACKGROUND

The emergence and popularity of mobile computing has made portable electronic devices, due to their compact design and light weight, a staple in today's marketplace. As a result, program developers are constantly creating content (e.g., applications, games, etc.) optimized for viewing on mobile devices such as smartphones and tablet personal computers. In addition, many users are now turning to these devices for accessing online content associated with various web pages—a function typically preformed on larger desktop-related displays. For most mobile devices, however, there currently exists a confusing separation between applications developed specifically for mobile devices and webpage content simply formatted for the device.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which.

DETAILED DESCRIPTION OF THE INVENTION

Figure 1:
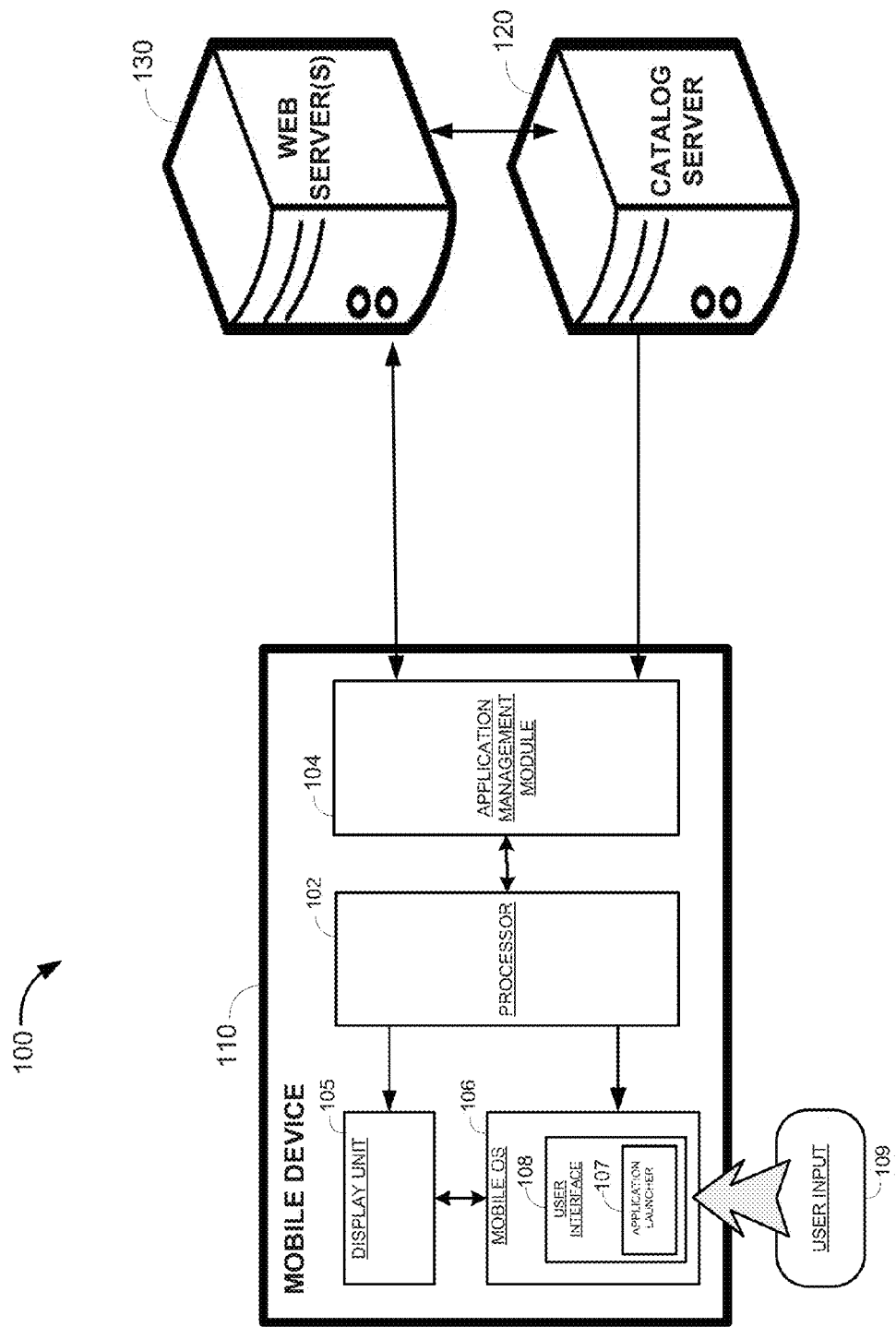
FIG. 1 is a simplified block diagram of a system for providing webpage content on a mobile device according to an example of the present invention.

The following discussion is directed to various embodiments. Although one or more of these embodiments may be discussed in detail, the embodiments disclosed should not be interpreted, or otherwise used, as limiting the scope of the disclosure, including the claims. In addition, one skilled in the art will understand that the following description has broad application, and the discussion of any embodiment is meant only to be an example of that embodiment, and not intended to intimate that the scope of the disclosure, including the claims, is limited to that embodiment. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced as 243 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

For many applications, such as news and content-based websites (e.g., New York Times or Newsweek), studies have shown that users often prefer applications because they are specific to the device and show up in the application launcher of the mobile operating system. Moreover, websites which hold the same content are harder to access on mobile platforms. Though a shortcut to a webpage would provide the same content, the discovery of that feature is rarely used. Prior solutions include providing a means for a user to download a static website shortcut onto a mobile device. The static shortcut link acts a launching mechanism to open a designated web site (e.g., shortcut to launch "www.HP.com"). However, this solution is simply a static shortcut that remains on the device permanently or until the user manually deletes it from the mobile device's memory and operating system.

Examples of the present invention provide a method and system for providing web content on a mobile device. According to one example, a webpage shortcut associated with a particular website or webpage is provided on an application catalog store. When the user downloads the webpage shortcut, they would be adding a shortcut link to the webpage to the application launcher of the mobile operating system. When a mobile application is made available either via the application catalog or website, the webpage shortcut is automatically updated into a mobile application for the mobile device.

Referring now in more detail to the drawings in which like numerals identify corresponding parts throughout the views, FIG. 1 is a simplified block diagram of a system for providing webpage content on a mobile device according to an example of the present invention. As shown in this example, the system 100 includes a mobile device, an application catalog server 120, and a web server(s) 130. The mobile device 110 includes a processor 102 coupled to a display unit 106, a mobile operating system 106, and a application management module 104. In one example embodiment, processor 102 represents a central processing unit (CPU), microcontroller, microprocessor, or logic configured to execute programming instructions associated with the mobile device 110. Display unit 106 represents an electronic visual and configured to display images and graphic for viewing by an operating user. The mobile operating system 106 includes a graphical user interface 108 for enabling input interaction 109 between an operating user and the mobile device 110. More particularly, the user interface 108 is configured to display an application launcher 107 and list of mobile applications and webpage shortcuts for accessing on the mobile device 110. The application management module 104 is configured to manage (e.g., local memory storage, network search, etc.) numerous mobile applications and webpage shortcuts [downloaded and installed on the mobile device 110. Moreover, catalog server 120 represents an online store and service for digital application/content distribution for mobile devices. The web server(s) 130 represents hardware and/or software that helps to deliver content associated with a particular webpage or website to be accessed through the internet. As will be used herein, a mobile application represents software written for mobile devices that performs a specific task and includes native applications, or applications specifically designed to run on a device's operating system and machine firmware, and web applications, or applications in which all or some parts of the software are downloaded from the web each time the application accessed.

Figure 2B:
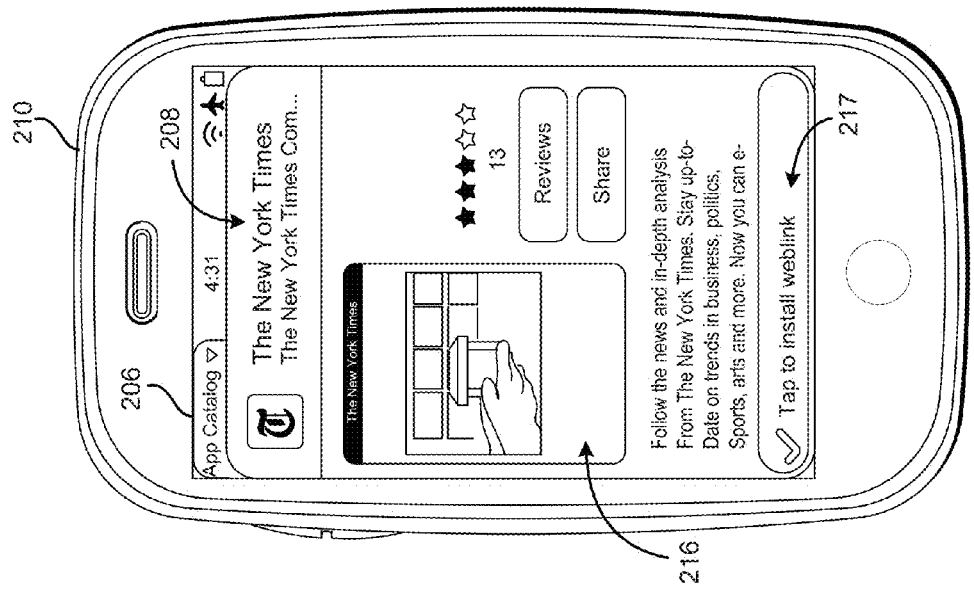
FIGS. 2A and 2B are screen shots of a mobile device and application catalog displaying mobile applications and webpage shortcuts according to an example of the present invention.
Figure 2A:
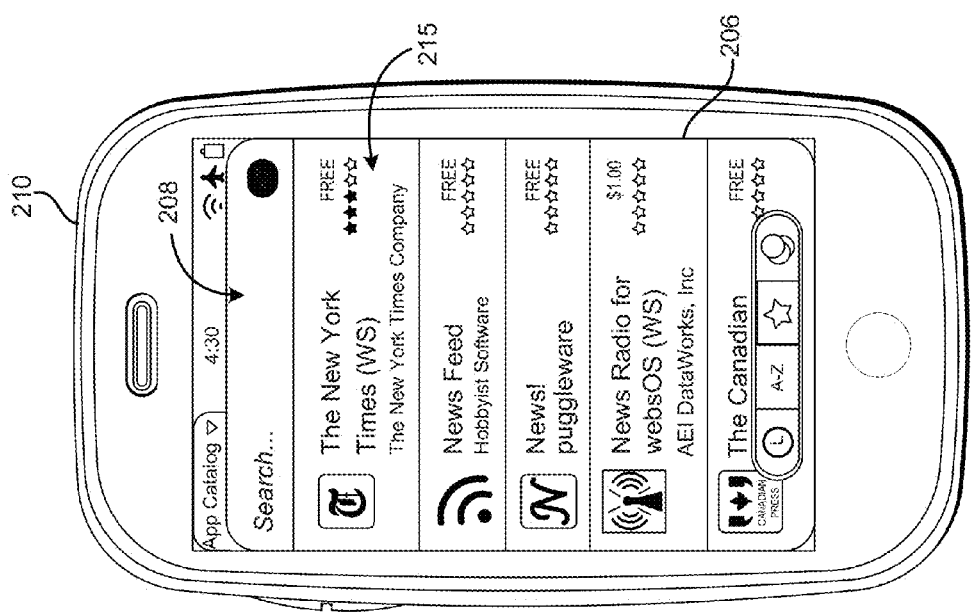

FIGS. 2A and 2B are screen shots of a mobile device and application catalog displaying mobile applications and webpage shortcuts according to an example of the present invention. As shown in FIG. 2A, the mobile device 210 includes a display unit 206 presently depicting graphics of an application catalog 215. Here, the application catalog 215 includes a number of mobile applications and/or webpage shortcuts associated with various developers and organizations. In the present example, the application catalog includes a "New York Times" webpage shortcut (WS) from the New York Times Company, a "News Feed" mobile application from Hobbyist Software, and a "News!" mobile application from puggleware. Moreover, FIG. 2B depicts a screen shot of the user interface 208 prompting the user for confirmation to install the weblink or webpage shortcut 216 onto the mobile device 210. According to one example embodiment, each webpage link or webpage shortcut can be upgraded to a downloadable mobile application when available. Specifically, the webpage shortcut 216 is a unique shortcut that can be seamlessly upgraded or updated into a mobile application when such application becomes available either on the web server or application catalog server.

Figure 2D:
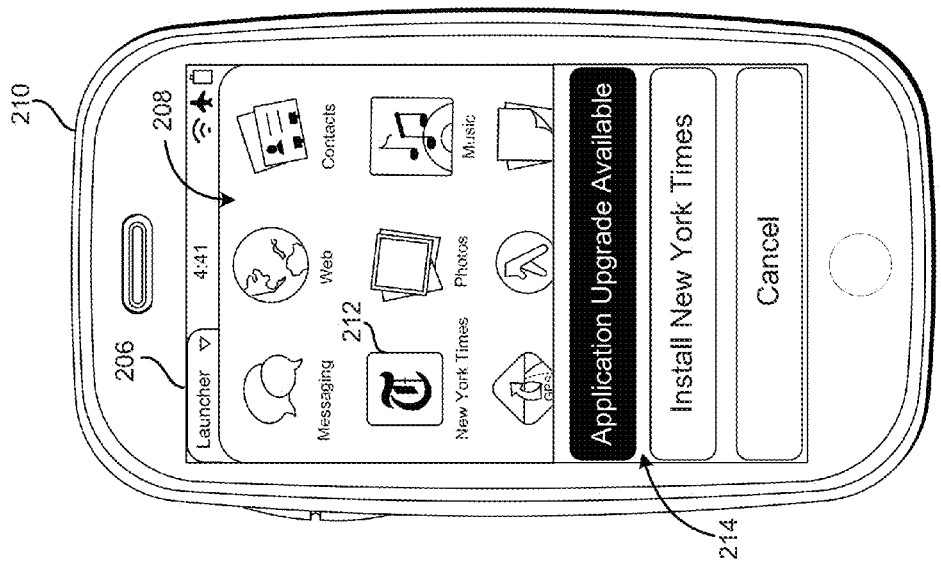
FIGS. 2C-2D are screen shots of an application launcher of the mobile device and notification for updating a webpage shortcut according to an example of the present invention.
Figure 2C:
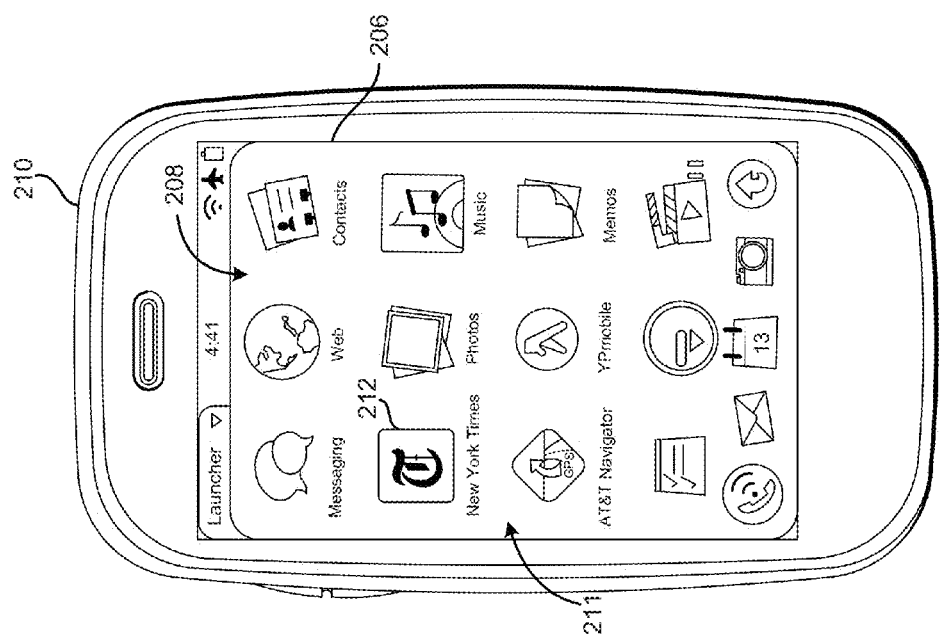

FIGS. 2C-2D are screen shots of an application launcher of the mobile device and notification for updating a webpage shortcut according to an example of the present invention. As shown in FIG. 2C, the application launcher and user interface 208 of the mobile device 210 includes several application icons 211 associated with a particular application or webpage (e.g., "Photos" is an application for viewing images stored on the mobile device, "Music" is an application for digital music playback, "Web" is a web browser program, etc.). Here, the downloaded webpage shortcut 212 for "New York Times" appears within the application launcher and user interface 208 as a normal application available for immediate access from the mobile device 210. When a mobile application for the associated webpage shortcut 212 becomes available for download, a notification 214 may be displayed on the mobile device 210 for confirming installation by the operating user as shown in FIG. 2D. The mobile application may also be downloaded automatically without user confirmation as will be explained in further detail with reference to FIGS. 3-6.

Figure 3:
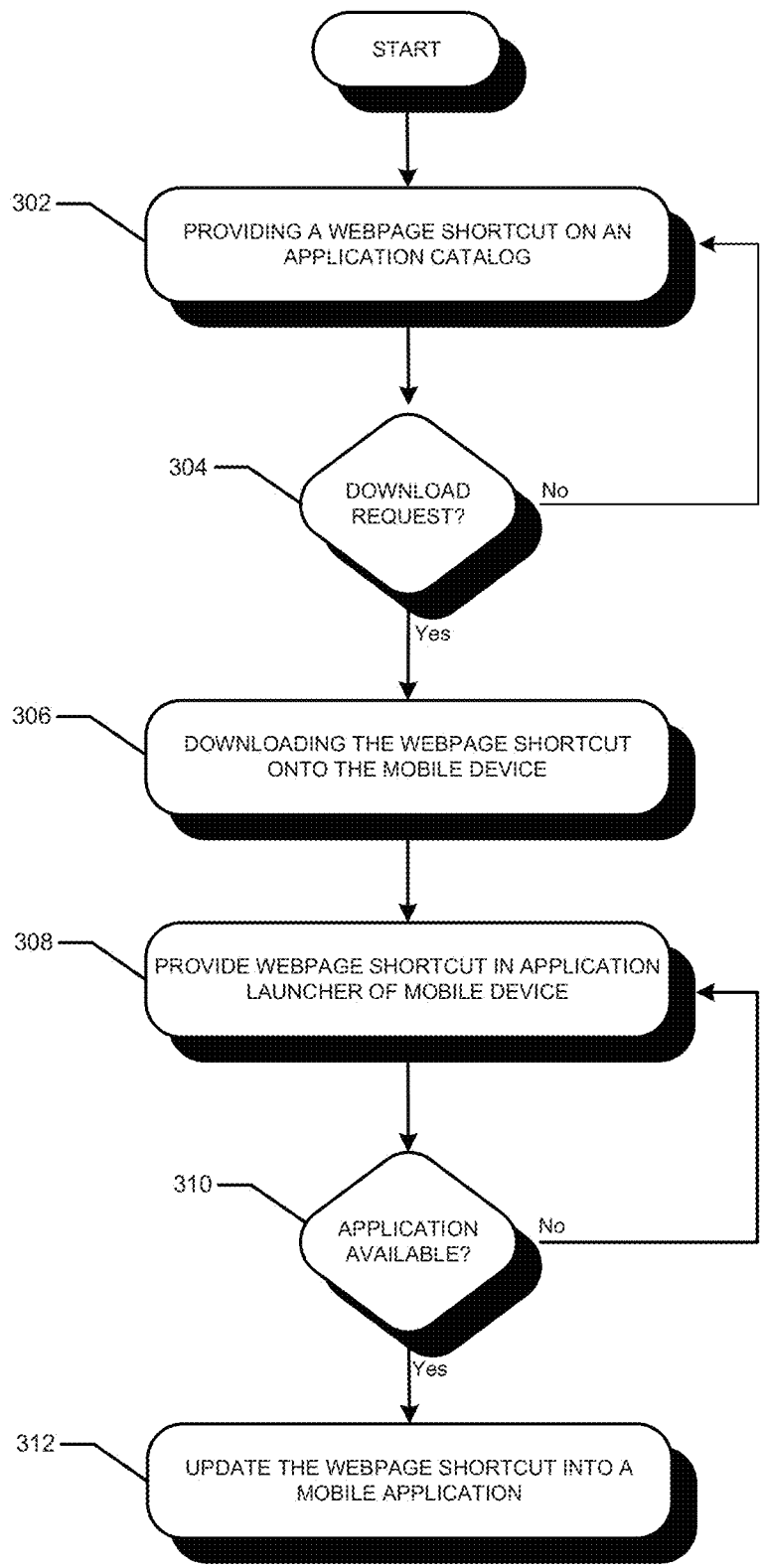
FIG. 3 is a simplified flow chart of the processing steps for providing web content on a mobile device according to an example of the present invention.

FIG. 3 is a simplified flow chart of the processing steps for providing web content on a mobile device according to an example of the present invention. In some cases, a website or application developer may elect to provide a mobile-optimized version of a particular website for interested users rather than a full-fledged mobile application developed for a specific device (e.g., HP TouchPad®). In such a case, the website or developer may register with the service provider and request that a shortcut associated with the optimized webpage is provided as a downloadable application on the application catalog server in step 302. Additionally, the application catalog server may receive a request from a third-party (e.g., interested user) to add a shortcut associated with a particular webpage/website. When a request by a user to download the webpage shortcut from the application catalog is received in step 304, then the webpage shortcut is downloaded onto the mobile device in step 306. Thereafter, in step 308, the webpage shortcut is provided in the application launcher of the mobile operating system of the device so as to appear and be accessed as would a normal mobile application (e.g., native application) running on the mobile device. When the availability of a mobile application by the developer/website associated with the webpage shortcut is determined in step 310, then the webpage shortcut is updated in step 312 from a simple hyperlink to a mobile-optimized website or webpage into a mobile application developed for the specific mobile device.

Figure 4:
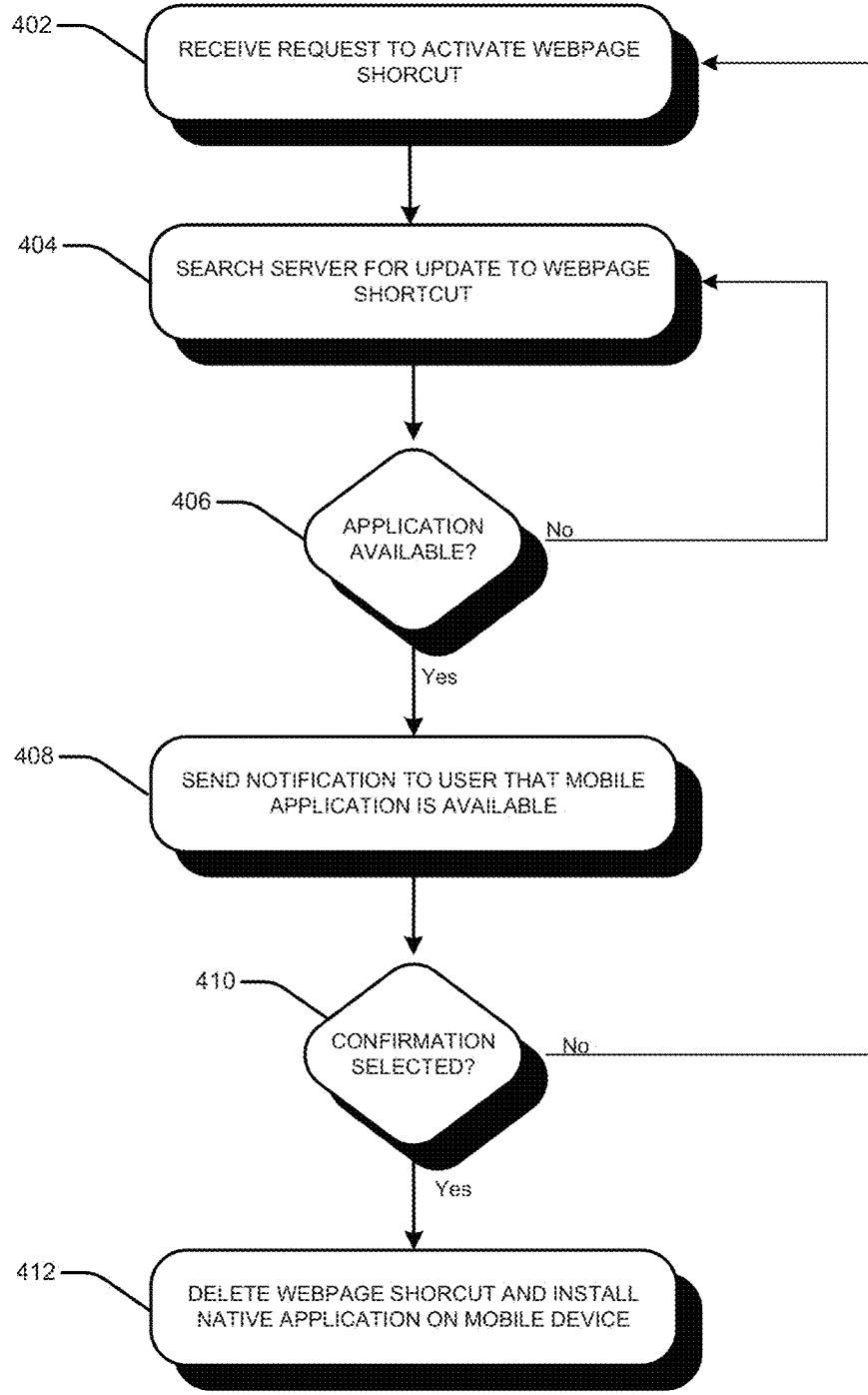
FIG. 4 is a simplified flow chart of the processing steps for updating a webpage shortcut using a shortcut-controlled method according to an example of the present invention.

FIG. 4 is a simplified flow chart of the processing steps for updating a webpage shortcut using a shortcut-controlled method according to an example of the present invention. In step 402, a request by the operating user to activate the webpage shortcut is received by the application management module. Upon receiving the request from the user, in step 404 the application management module searches the application catalog server or web server for the availability of a mobile application associated with the webpage shortcut. If the application is determined to be available in the step 406, then in step 408 a notification is sent to the user regarding the availability of an upgrade of the webpage shortcut into a mobile application. Once the user confirms the upgrade (via a confirmation check box, on-screen button, etc.) in step 410, then the webpage shortcut is deleted and the mobile application is downloaded and installed on the mobile device in step 412.

Figure 5:
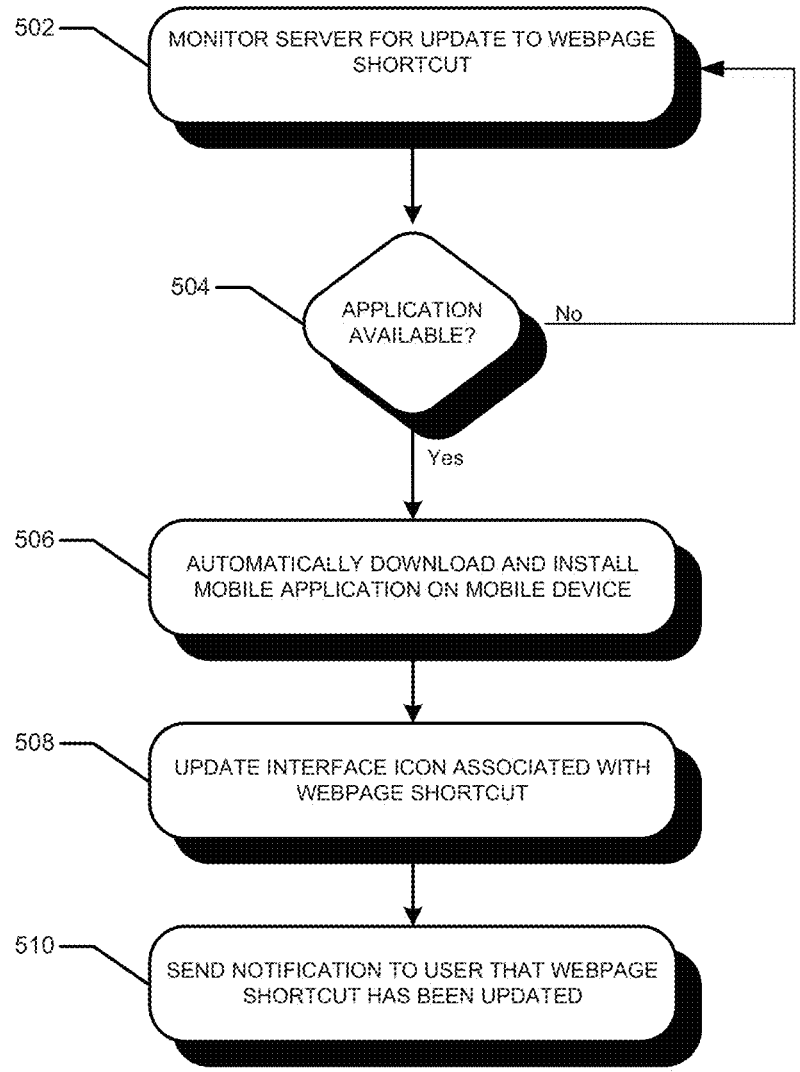
FIG. 5 is a simplified flow chart of the processing steps for updating a webpage shortcut using a system-controlled method according to an example of the present invention.

FIG. 5 is a simplified flow chart of the processing steps for updating a webpage shortcut using a system-controlled method according to an example of the present invention. In one example, the mobile device and mobile operating system can subscribe with the web server and/or catalog server to receive information regarding application updates. In step 502, the application management module monitors the web server and/or the catalog server for the availability of upgrades to the webpage shortcut. If a mobile application associated with the webpage shortcut is found in step 504, then the mobile application is downloaded and installed onto the mobile device in step 506. Next, in step 508, the interface or application icon associated with the webpage shortcut is updated to a new icon associated with the mobile application so as to inform the user of the upgrade. However, the interface icon associated with the webpage shortcut may also be used as the interface icon for the new mobile application. In addition or in lieu of the icon update, in step 510 a notification may be sent to the user to alert the user of that the webpage shortcut has now been upgraded to a mobile application.

Figure 6:
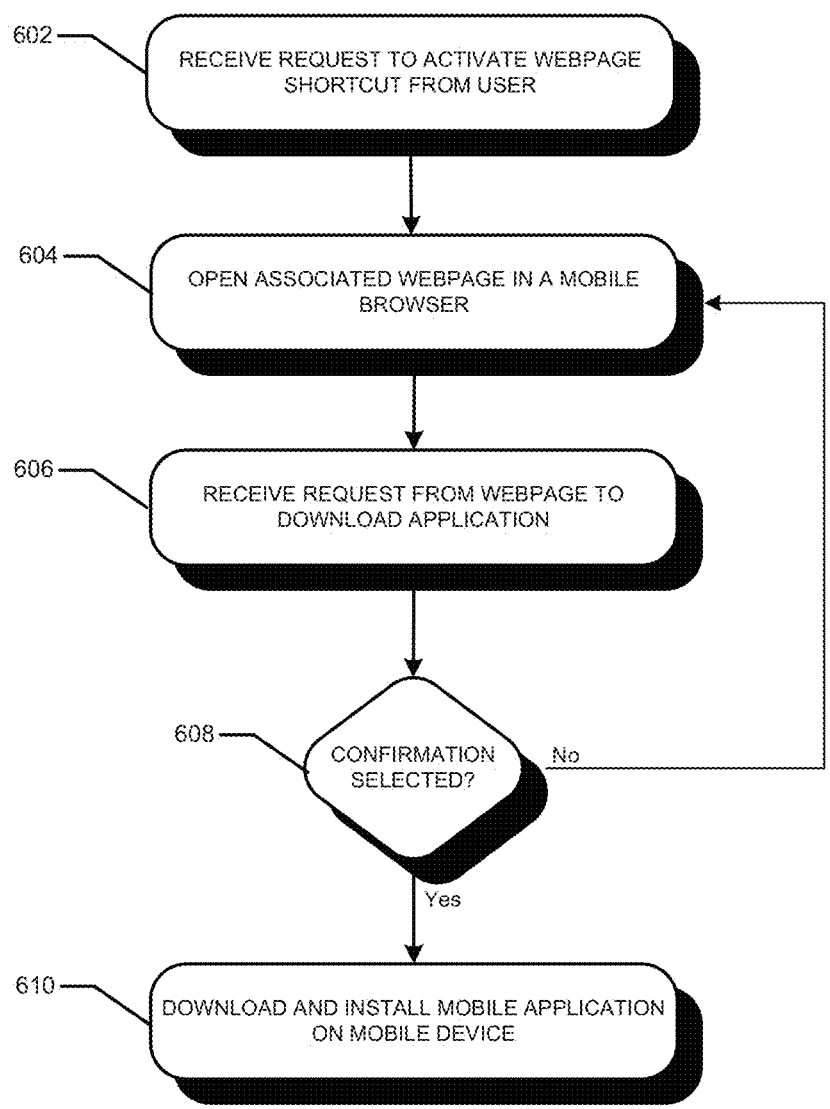
FIG. 6 is a simplified flow chart of the processing steps for updating a webpage shortcut using a webpage-controlled method according to an example of the present invention.

FIG. 6 is a simplified flow chart of the processing steps for updating a webpage shortcut using a webpage-controlled method according to an example of the present invention. In step 602, the application management module receives from the user a request to activate the webpage shortcut. Thereafter, in step 604 the application management module executes the user's request and opens the webpage or website (i.e., uniform resource locator) associated with the webpage shortcut. Upon opening the URL associated with the webpage shortcut, in step 606 a request may be received from the webpage/website to download an associated mobile application. If the user confirms acceptance of the download in step 608 (via a checkbox or interface button), then mobile application is downloaded and installed on the mobile device in step 610.

Moreover, several advantages are afforded by the method and system disclosed in the present examples. For instance, providing a mobile application store that automatically populates the store with content from webpages would drastically increase the accessibility of web content to mobile users. When users browse the application catalog, they would find mobile-optimized websites in the list in addition to fully-functional applications, thereby increasing the number of available applications in the application catalog. Still further, such a configuration would allow developers who do not have the resources to develop a specific application for the mobile platform to direct users to their optimized website instead. The user would then always be able to find the web content they want in the application store. When the application developer does create a custom application for a mobile platform, the application could be automatically downloaded onto any mobile device in order to upgrade the webpage-based shortcut to a mobile application for the mobile device—functionality accomplished with minimal interaction from the operating user.

Furthermore, while the invention has been described with respect to exemplary embodiments, one skilled in the art will recognize that numerous modifications are possible. For example, although exemplary embodiments depict a smartphone as the mobile device, the invention is not limited thereto. For example, the mobile device may be a netbook, a tablet personal computer, or any other portable electronic device capable of running various mobile application software. Furthermore, the interface icons and layout thereof with respect to the application catalog store and application launcher of the mobile device may be arranged and displayed in any manner rather than the layout depicted in the related figures. Thus, although the invention has been described with respect to exemplary embodiments, it will be appreciated that the invention is intended to cover all modifications and equivalents within the scope of the following claims.

What is claimed is:

1. A method for providing web content on a mobile device:
presenting an application catalog at a display of the mobile device, wherein the application catalog includes at least one webpage shortcut associated with a webpage;
downloading the webpage shortcut onto the mobile device based on a selection from an operating user browsing the application catalog;
installing the webpage shortcut within an application launcher of an operating system associated with the mobile device;
presenting the webpage shortcut within the application launcher as an icon; and
updating the webpage shortcut into a mobile application.

2. The method of claim 1, wherein the webpage shortcut is automatically updated when the mobile application becomes available on the application catalog.

3. The method of claim 1, further comprising:
displaying the webpage shortcut as an interface icon on a user interface of the mobile device.

4. The method of claim 3, wherein the step of updating the webpage shortcut into a mobile application further comprises:
determining the availability of a mobile application for the webpage shortcut each time the webpage shortcut is accessed by the operating user;
sending a notification to the operating user of the availability of an update to the webpage shortcut; and
automatically updating the webpage shortcut based on a selection by the operating user.

5. The method of claim 3, wherein the step of step of updating the webpage shortcut into a mobile application further comprises:
monitoring, via an operating system of the mobile device, a web server for the availability of a mobile application associated with the webpage shortcut;
automatically downloading the mobile application on the mobile device upon detecting the availability of the mobile application on the web server.

6. The method of claim 5, further comprising:
sending a notification to the user that the webpage shortcut has been updated to the mobile application.

7. The method of claim 5, wherein selection of the icon initiates presentation of the webpage associated with the webpage shortcut, wherein updating the webpage shortcut into the mobile application includes associating the icon with the mobile application, and wherein, after the webpage shortcut is updated into the mobile application, selection of the icon launches the mobile application.

8. The method of claim 1, wherein the step of updating the webpage shortcut into a mobile application further comprises:
receiving, from the operating user, a request to activate the webpage shortcut;
opening the associated webpage in a web browser of the mobile device;
receiving, from the webpage, a request to download a mobile application associated with the webpage;
automatically updating the webpage shortcut to the mobile application based on a selection from the user.

9. A system for providing web content on a mobile device, the system comprising:
a web server configured to transmit information relating to a webpage;
a catalog server configured to receive information from the web server and provide a list of available mobile applications and at least one webpage shortcut associated with a webpage; and
a mobile device including a display and user interface, wherein the mobile device is configured to display a downloaded webpage shortcut as an interface icon on the user interface, wherein the webpage shortcut is installed and provided within an application launcher of an operating system associated with the mobile device;
wherein when a mobile application is available on the webpage server, the webpage shortcut is updated to a mobile application on the mobile device.

10. The system of claim 9, wherein the webpage shortcut is automatically updated when the mobile application becomes available on the application catalog.

11. The system of claim 9, wherein the mobile device further comprises:
an application management module configured to manage a plurality of webpage shortcuts and mobile applications on the mobile device.

12. The system of claim 11, wherein the application management module is further configured to:
determine the availability of a mobile application for the webpage shortcut each time the webpage shortcut is accessed by the operating user;
send a notification to the operating user of the availability of an update to the webpage shortcut; and
automatically update the webpage shortcut based on a selection by the operating user.

13. The system of claim 11, wherein the application management module is further configured to:
monitor a web server for the availability of a mobile application associated with the webpage shortcut; and
automatically download the mobile application on the mobile device when the mobile application is available on the web server.

14. The system of claim 11, wherein the application management module is further configured to:

send a notification to the user that the webpage shortcut has been updated to the mobile application; and replace an icon associated with the webpage shortcut to a second icon associated with the mobile application.

15. The system of claim 11, wherein the application management module is further configured to:

receive a request to activate the webpage shortcut;

open the associated webpage in a web browser of the mobile device;

receive a request to download a mobile application associated with the webpage; and automatically update the webpage shortcut to the mobile application based on a selection from the user.

16. A method for providing web content on a mobile device:

presenting an application catalog at a display of the mobile device, wherein the application catalog includes a plurality of mobile applications and at least one webpage shortcut associated with a webpage;

downloading the webpage shortcut onto the mobile device based on a selection from an operating user browsing the application catalog;

installing the webpage shortcut within an application launcher of an operating system associated with the mobile device;

displaying the webpage shortcut as an application icon on a user interface of the mobile device; and automatically updating the webpage shortcut into a mobile application when the mobile application becomes available on the application catalog.

17. The method of claim 16, wherein the step of updating the webpage shortcut into a mobile application further comprises:

determining the availability of a mobile application for the webpage shortcut each time the webpage shortcut is accessed by the operating user;

sending a notification to the operating user of the availability of an update to the webpage shortcut; and automatically updating the webpage shortcut based on a selection by the operating user.

18. The method of claim 16, wherein the step of step of updating the webpage shortcut into a mobile application further comprises:

monitoring, via an operating system of the mobile device, a web server for the availability of a mobile application associated with the webpage shortcut;

automatically downloading the mobile application on the mobile device upon detecting the availability of the mobile application on the web server.

19. The method of claim 18, further comprising:

sending a notification to the user that the webpage shortcut has been updated to the mobile application; and replacing an icon associated with the webpage shortcut with a second icon associated with the mobile application.

20. The method of claim 16, wherein the step of updating the webpage shortcut into a mobile application further comprises:

receiving, from the operating user, a request to activate the webpage shortcut;

opening the associated webpage in a web browser of the mobile device;

receiving, from the webpage, a request to download a mobile application associated with the webpage;

automatically updating the webpage shortcut based on a selection from the user.

* * * * *